(12) United States Patent
Gellert et al.

(10) Patent No.: US 6,318,990 B1
(45) Date of Patent: Nov. 20, 2001

(54) INJECTION MOLDING NOZZLE APPARATUS

(75) Inventors: Jobst Ulrich Gellert; Denis L. Babin, both of Georgetown; George T Olaru, Toronto, all of (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/610,009

(22) Filed: Jul. 3, 2000

Related U.S. Application Data (63) Continuation-in-part of application No. 09/197,784, filed on Nov. 23, 1998, now abandoned.

Foreign Application Priority Data

Oct. 16, 1998  (CA) .................................................. 2250598

(51) Int. Cl.[7] .................................................. B29C 45/20
(52) U.S. Cl. .......................................................... 425/549
(58) Field of Search ............................................. 425/549

(56) References Cited

U.S. PATENT DOCUMENTS

| | | |
|---|---|---|
| 4,557,685 | 12/1985 | Gellert . |
| 4,768,945 | 9/1988 | Schmidt et al. . |
| 4,771,534 | 9/1988 | Gellert et al. . |
| 5,032,078 | 7/1991 | Benenati . |
| 5,208,052 | 5/1993 | Schmidt et al. ....................... 425/549 |
| 5,269,676 | 12/1993 | Gellert . |
| 5,533,882 | 7/1996 | Gessner et al. . |
| 5,658,604 | 8/1997 | Gellert et al. . |
| 5,795,599 | 8/1998 | Gellert . |

FOREIGN PATENT DOCUMENTS

| | | |
|---|---|---|
| 0 374 549 | 6/1990 | (EP) . |
| 0 475 143 | 3/1992 | (EP) . |
| 0 835 732 A1 | 4/1998 | (EP) . |
| 0 885 707A1 | 12/1998 | (EP) . |

*Primary Examiner*—Tim Heitbrink
(74) *Attorney, Agent, or Firm*—Foley & Lardner (57) ABSTRACT

Injection molding apparatus wherein a heated nozzle extends into an opening in a cooled mold. The nozzle has a locating and sealing ring made of a deformable material. After installation the locating and sealing ring contacts an inwardly tapered surface of the mold or an insert seated in the mold extending around the opening. When the nozzle is heated to the operating temperature, thermal expansion drives the locating and sealing ring forwardly into greater contact against the inwardly tapered surface. In one embodiment, the locating and sealing ring is near the front of the nozzle, and the nozzle also has a rear locating flange. During insertion of the nozzle into place in the opening and thermal expansion of the nozzle, the rear locating flange first comes into contact with an inwardly tapered shoulder extending around the opening which prealigns the nozzle. Then before the front locating and sealing ring comes into contact with the inwardly tapered surface and is partially deformed thereby which very accurately align the tip of the nozzle with the gate.

28 Claims, 7 Drawing Sheets

INJECTION MOLDING NOZZLE APPARATUS

This application is a continuation in part of application Ser. No. 09/197,784 filed Nov. 23, 1998 now abandoned.

BACKGROUND OF THE INVENTION

This invention relates generally to injection molding and more particularly to apparatus for locating and sealing an injection molding nozzle in an opening in the mold.

Very accurate location of a heated nozzle in an opening in a cooled mold has become more and more critical for successful hot tip gating. As seen in the applicant's U.S. Pat. No. 4,557,685 which issued Dec. 10, 1985 and U.S. Pat. No. 4,768,945 to Schmidt et al. which issued Sep. 6, 1988 it is well known for heated injection molding nozzles used for hot tip gating to have a rear locating flange and a front seal extending therearound. Another example of hot tip gating is shown in U.S. Pat. No. 5,658,604 to Gellert et al. which issued Aug. 19, 1997 in which the front seal is provided by a threaded nozzle seal which is screwed into the front end of the nozzle.

U.S. Pat. No. 4,771,534 to Gellert et al. shows a nozzle with a sealing and locating flange but it does not abut against an inwardly tapered surface. U.S. Pat. No. 5,269,676 shows a seating and sealing insert, but it does not have an inwardly tapered surface against which a locating and sealing ring can seat.

However, the previous apparatus all has the disadvantage that extremely close tolerances are required to ensure the front end of the nozzle is accurately aligned and there is a good seal against melt leakage.

SUMMARY OF THE INVENTION

Accordingly, it is an object of the present invention to at least partially overcome the disadvantages of the prior art by providing injection molding apparatus wherein each nozzle has a locating and sealing ring which abuts against an inwardly tapered shoulder or surface whereby thermal expansion improves the seal.

To this end, in one of its aspects, the invention provides injection molding apparatus having an integral heated nozzle extending into an opening in a mold. The opening has a rear end and a surface extending to a gate leading to a cavity. The integral heated nozzle has an elongated inner portion, an outer collar portion, and an electrical heating element. The elongated inner portion has a rear end, a front end, a melt bore extending therethrough from the rear end to the front end, and a generally cylindrical outer surface with a spiral groove extending therearound. The electrical heating element is wound into the spiral groove extending around the outer surface of the inner portion and the outer collar portion fits around the inner portion adjacent the rear end of the inner portion. The surface of the opening in the mold has a first locating shoulder extending inwardly near the rear end and a second locating shoulder extending inwardly near the gate. The nozzle has a rear locating flange to extend outwardly into locating contact with the first inwardly extending locating shoulder of the surface of the opening in the mold. A front locating and sealing ring is mounted around the heated nozzle near the front end of the heated nozzle to provide locating contact the with the second inwardly extending locating shoulder of the surface of the opening in the mold. The distance between the first inwardly extending locating shoulder and the second inwardly extending locating shoulder being greater than the distance between the rear locating flange and the front locating and sealing ring. Thus, during insertion of the nozzle into the opening in the mold and thermal expansion of the nozzle, the rear locating flange comes into locating contact with the first inwardly extending locating shoulder of the surface of the opening in the mold to prealign the nozzle before the front locating and sealing ring comes into locating and sealing contact with the second inwardly extending locating shoulder of the surface of the opening in the mold.

In another aspect, the invention proves an injection molding apparatus having a nozzle extending into an opening in a mold. The opening extends to a gate leading to a cavity. The opening has a surface with a tapered portion that tapers inwardly toward the gate. The nozzle has a melt bore extending therethrough. A locating and sealing ring secured to the nozzle contacts the inwardly tapered portion of the surface. Thus, thermal expansion from heating to an operating temperature drives the locating and sealing ring forwardly into greater contact against the inwardly tapered portion of the surface of the opening.

In a further aspect, the invention provides a n injection molding apparatus having a nozzle extending into an opening in an insert received in an opening in a mold. The opening in the mold extends to a gate leading to a cavity. The opening in the insert has a surface with a tapered portion that tapers inwardly toward the gate. The nozzle has a melt bore extending therethrough. A locating and sealing ring secured to the nozzle contacts the inwardly tapered portion of the surface of the opening in the insert. Thus, thermal expansion from heating to an operating temperature drives the locating and sealing ring forwardly into greater contact against the inwardly tapered portion of the surface of the opening in the insert.

Further objects and advantages of the invention will appear from the following description taken together with the accompanying drawings.

DETAILED DESCRIPTION OF THE INVENTION

Figure 1:
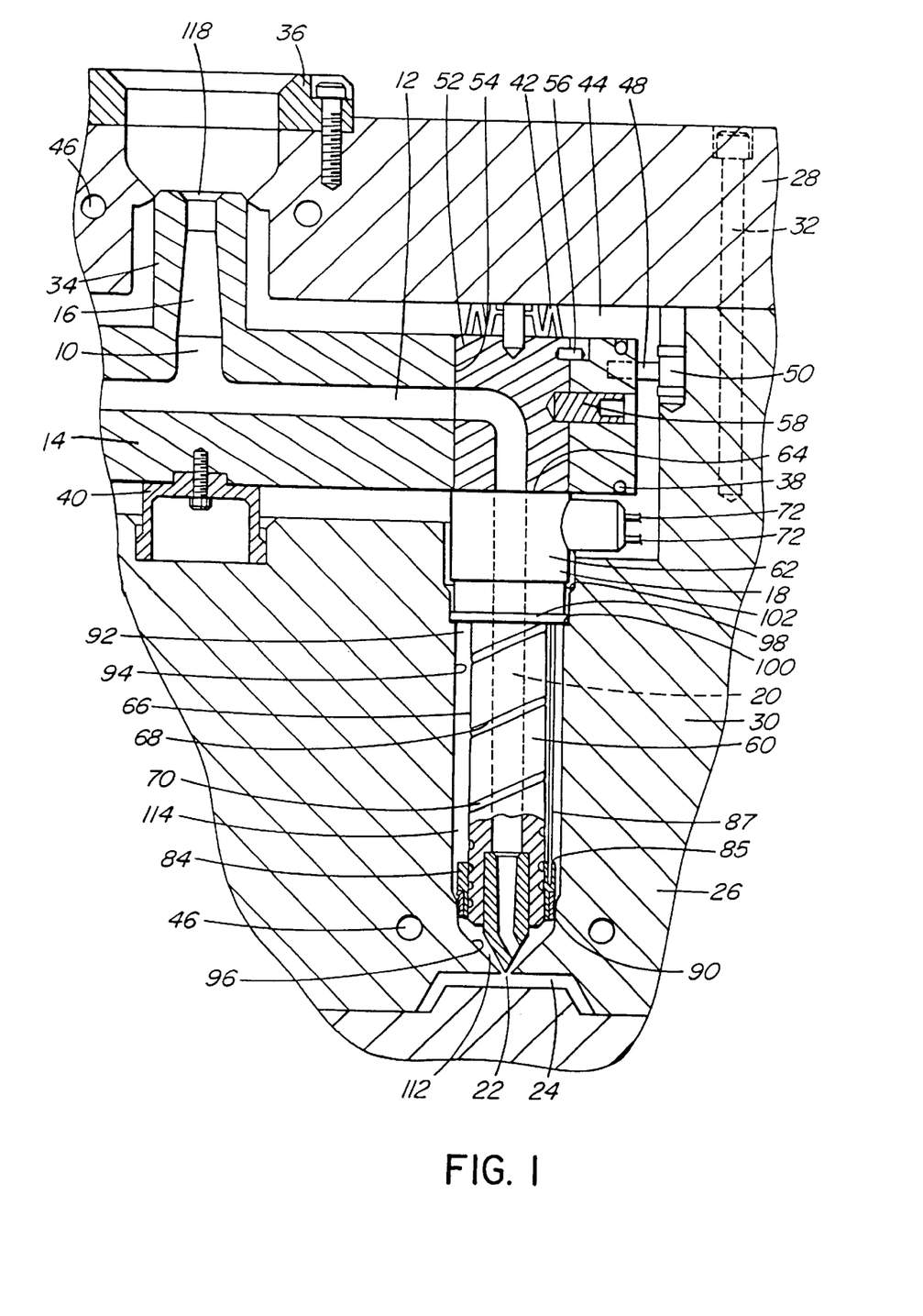
FIG. 1 is a sectional view of a portion of a multi-cavity injection molding apparatus in the operating position according to a first embodiment of the invention.
Figure 2:
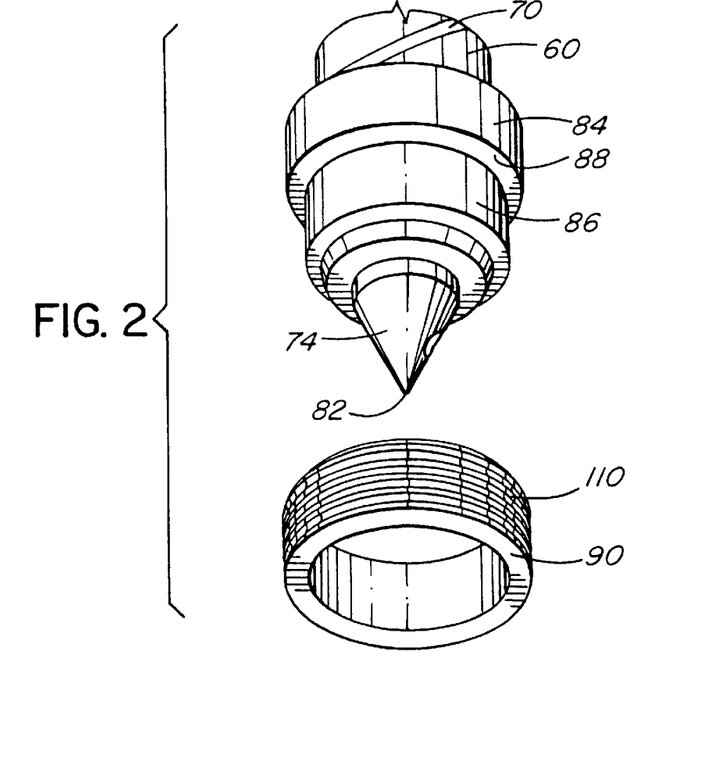
FIG. 2 is an isometric view of the front end of the nozzle and the front locating and sealing ring seen in FIG. 1.

Reference is first made to FIG. 1 which shows a portion of a multi-cavity hot tip gated injection molding system or apparatus according to a first embodiment of the invention having a melt passage 10 with branches 12 which extend outwardly in a steel melt distribution manifold 14 from a central inlet portion 16 to an integral heated nozzle 18. Each branch 12 of the melt passage 10 extends through a central melt bore 20 in one of the heated nozzles 18 to a gate 22 leading to a cavity 24. While the mold 26 can have a greater number of plates depending upon the application, in this case, only a back plate 28 and a manifold plate 30 secured together by bolts 32 are shown for ease of illustration.

The melt distribution manifold 14 has a central inlet portion 34 surrounded by a locating ring 36 and is heated by an integral heating element 38. The melt distribution manifold 14 is mounted between the back plate 28 and the manifold plate 30 by a central manifold locator 40 and a number of pressure discs 42 which provide an insulative air space 44 between the heated manifold 14 and the surrounding mold 26 which is cooled by pumping a cooling fluid such as water through cooling conduits 46. The melt distribution manifold 14 is accurately aligned in place by a locating pin 48 extending outward into a cam 50 seated in the manifold plate 30. Each branch 12 of the melt passage 10 bends in a steel plug 52 seated in an opening 54 through the melt distribution manifold 14. The plug or insert 52 is very accurately aligned in place by a small prealignment pin 56 and a larger alignment and retaining pin 58.

Figure 3:
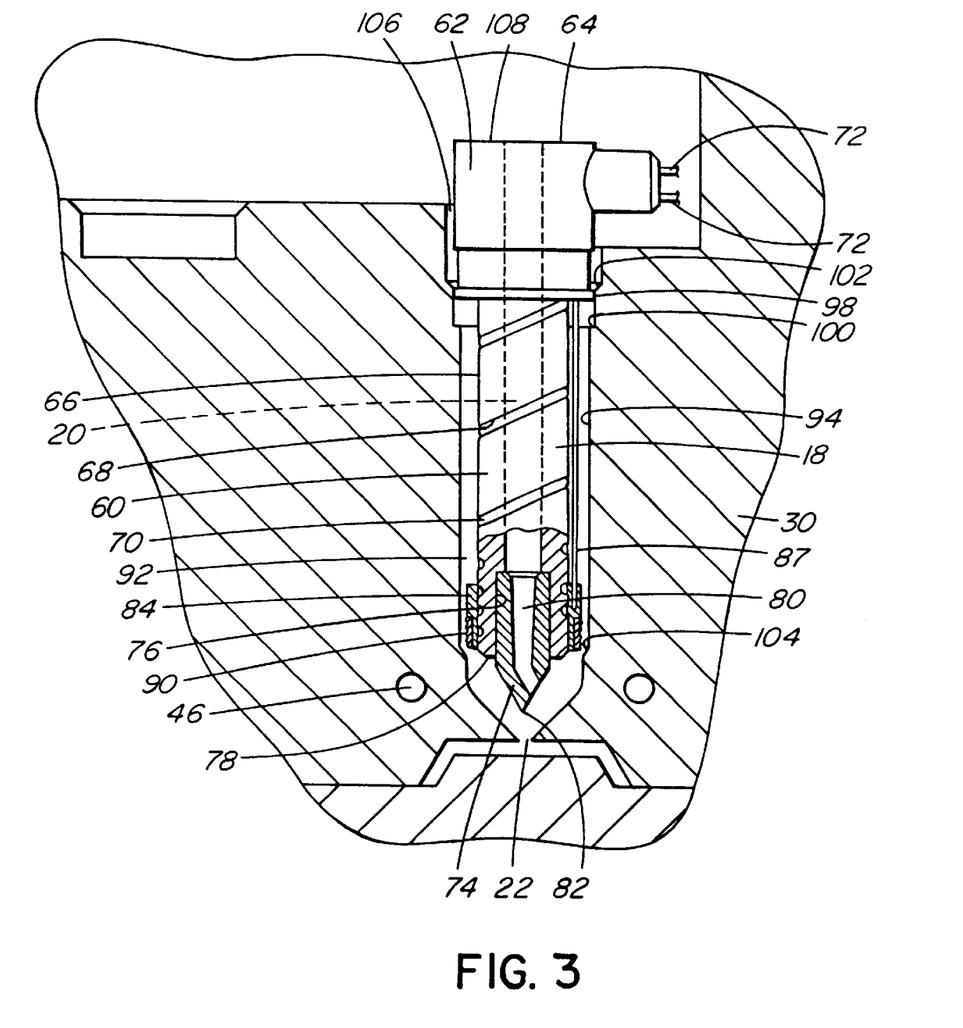
FIG. 3 is a sectional view similar to FIG. 1 showing one of the nozzles being inserted into place.
Figure 4:
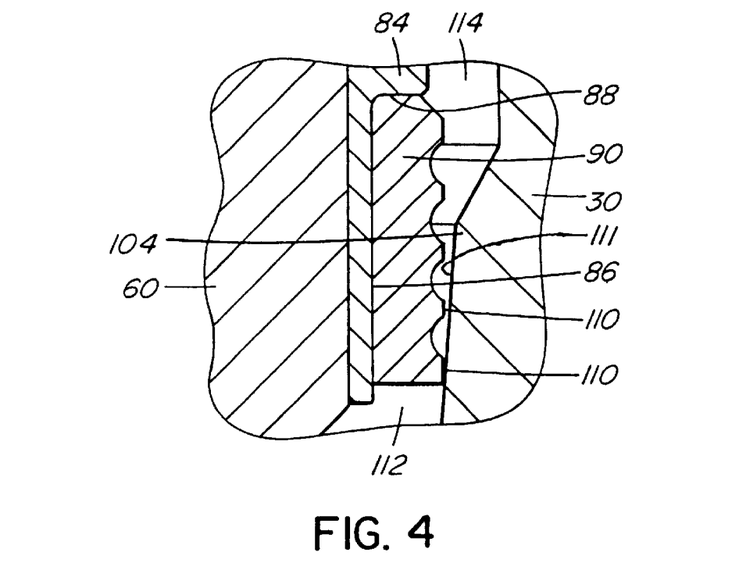
FIG. 4 is a sectional view showing the ribbed locating and sealing ring contacting the surface of the mold during insertion.
Figure 5:
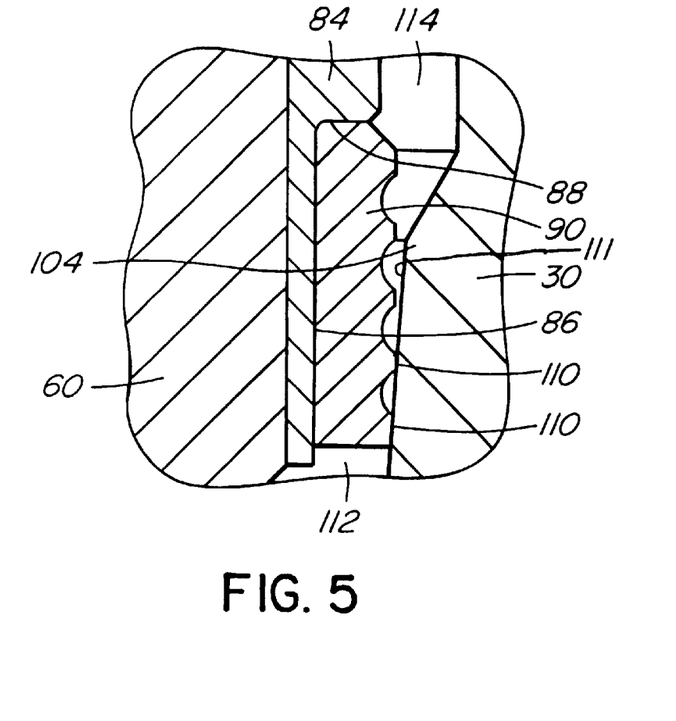
FIG. 5 is a similar view showing the ribbed locating and sealing ring fully inserted.

As also seen in FIG. 3, each of the heated nozzles 18 has an elongated inner portion 60 with the central bore 20 extending therethrough and an integral outer collar portion 62 fitting around its rear end 64. The inner portion 60 has a cylindrical outer surface 66 with a spiral groove 68 into which an electrical heating element 70 is wound. The electrical heating element 70 has terminal portions 72 extending outwardly through the outer collar portion 62. Each heated nozzle 18 has a tip insert 74 integrally brazed into a seat 76 in the front end 78 of its inner portion 60. The tip insert 74 has a melt bore 80 extending therethrough and a tip 82 which must be very accurately aligned with the gate 22. As best seen in FIGS. 4 and 5, the heated nozzle 18 also has a locating and sealing ring backer sleeve 84 integrally brazed around its inner portion 60 adjacent its front end 78. In this embodiment, the locating and sealing ring backer sleeve 84 has a hole 85 into which a thermocouple element 87 extends to control the operating temperature. The locating and sealing ring backing sleeve 84 has an outer surface 86 with a forwardly facing outer shoulder 88. A ribbed locating and sealing ring 90 is heat shrunk around the outer surface 86 of the locating and sealing ring backer sleeve 84 to abut against the outer shoulder 88. The ribbed locating and sealing ring 90 is made of a material such as a soft titanium alloy which is suitably deformable as described below.

Each heated nozzle 18 extends into an elongated opening 92 in the mold 26. As can be seen, the elongated opening 92 has a surface 94 which is generally cylindrical with a tapered portion 96 extending inwardly to the gate 22. The outer collar portion 62 of the heated nozzle 10 has a forwardly extending locating flange 98 which abuts against an inwardly extending seat or shoulder 100 on the surface 94 of the opening 92 in the mold 26. The surface 94 of the opening 92 also has a first locating shoulder 102 which tapers inwardly near its rear end 106 and a second locating shoulder 104 which tapers inwardly near the gate 22. The first locating shoulder 102 tapers inwardly to fit around the rear locating flange 98 to accurately locate the rear end 108 of the heated nozzle 18 in the operating position shown in FIG. 1. The second locating shoulder 104 tapers inwardly to fit around the front locating and sealing ring 90 to accurately locate the tip 82 of the tip insert 74 with the gate 22.

The distance between the first locating shoulder 102 and the second locating shoulder 104 is greater than the distance between the rear locating flange 98 and the front locating and sealing ring 90. Thus, as clearly seen in FIG. 3, when each nozzle 18 is inserted into one of the elongated openings 92 in the mold 26, the rear locating flange 98 of the outer collar portion 62 contacts the first locating shoulder 102 before the front locating and sealing ring 90 contacts the second locating shoulder 104. The contact between the rear locating flange 98 and the first locating shoulder 102 when the nozzle 10 is partially inserted into the opening 92 aligns the nozzle 18 so the tip 82 of the tip insert 74 is first prealigned with the gate 22. Then, as the nozzle 18 is further inserted into the elongated opening 92, the front locating and sealing ring 90 contacts the second locating shoulder 104 which more accurately aligns the tip 82 of the tip insert 74 with the gate 22. As seen in FIG. 4 in this fully inserted position the front locating and sealing ring 90 is in contact with a first part of an inwardly tapered portion 111 of the surface 94.

Finally, when the melt distribution manifold 14 and the nozzles 18 are heated to the operating temperature, thermal expansion drives the front locating and sealing ring 90 further forward into contact with a larger portion of the tapered portion 111 of the surface 94. As seen in FIG. 5, this deforms the ribs 110 sufficiently to very accurately locate the tip 82 of the tip insert 74 with the gate 22. The deformed locating and sealing ring 90 also seals against the second locating shoulder 104 to prevent melt leakage from the space 112 around the tip insert 74 into the insulative air space 114 around the heated nozzle 10. In this final operating position, the locating flange 98 of the outer collar portion 62 abuts against the seat 100 extending around the surface 94 of the elongated opening in the mold.

Figure 6:
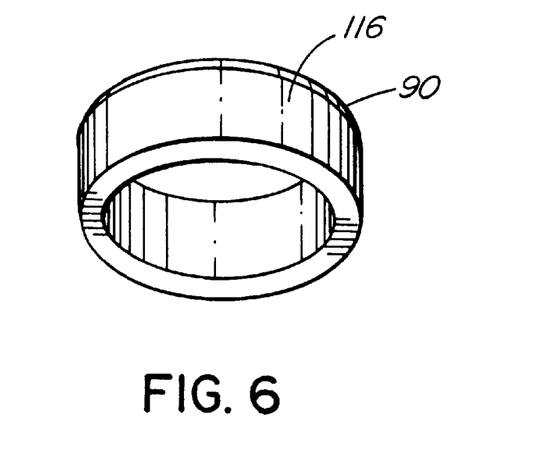
FIG. 6 is an isometric view of a locating and sealing ring according to another embodiment of the invention.

As seen in FIG. 6, in another embodiment the locating and sealing ring 90 which is made of a suitably deformable material such as a soft titanium alloy can be made with a cylindrical outer surface 116 rather than with the ribs 110 seen in the first embodiment.

In use, the system is assembled as shown in FIG. 1. Electrical power is applied to the heating elements 38, 70 in the melt distribution manifold 14 and the nozzles 18 to heat them to a predetermined operating temperature. Pressurized melt is then supplied from a molding machine (not shown) to a central inlet 118 of the melt passage 10 according to a predetermined cycle. The melt flows through the melt distribution manifold 14 and the heated nozzles 18 into the cavities 24. After the cavities 24 are filled and a suitable packing and cooling period has expired, injection pressure is released. The mold 26 is then opened to eject the molded product. After ejection, the mold 26 is closed and the cycle is repeated continuously every 15 to 30 seconds with a frequency depending upon the wall thickness and number and size of the cavities 24 and the exact material being molded.

Figure 7:
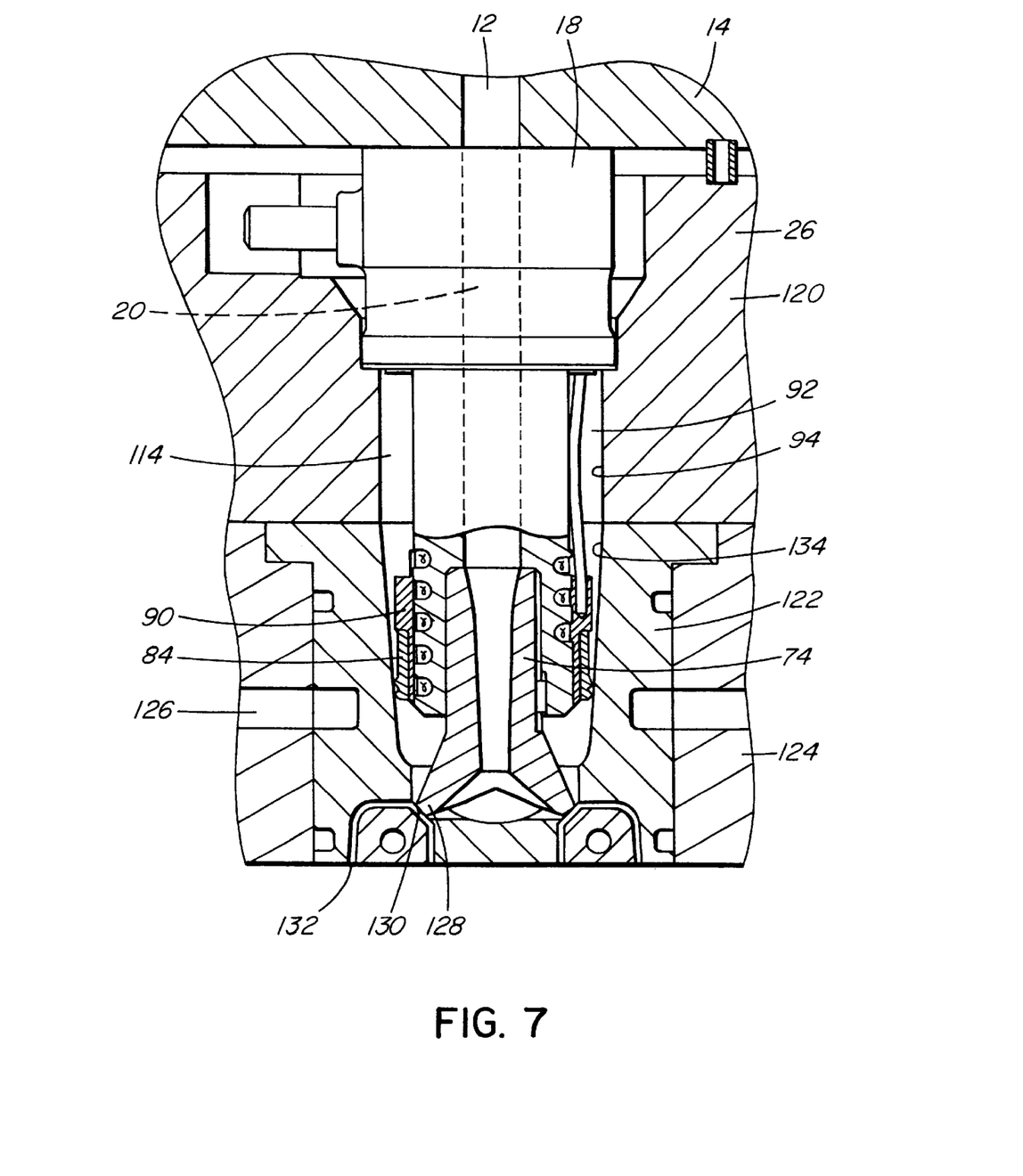
FIG. 7 is a sectional view of a portion of a multi-cavity injection molding apparatus according to another embodiment of the invention.

Reference is now made to FIG. 7 to describe another embodiment of the invention. As many of the elements are the same as those described above, common elements are described and illustrated using the same reference numerals. In this embodiment, the mold 26 has a manifold plate 120 and a cavity insert 122 seated in a cavity plate 124. Cooling is provided by circulating cooling fluid through cooling conduits 126. As can be seen, the insert 74 in the nozzle 18 has a number of tips 128, each aligned with a gate 130 leading to a cavity 132.

In this embodiment, the surface 94 of the opening 92 in the mold 26 has a portion 134 extending through the cavity insert 122 that tapers slightly inwardly. When the apparatus is assembled, the locating and sealing ring 90 mounted on the locating and sealing ring backing sleeve 84 abuts against the inwardly tapered portion 134 of the surface 94 which prealigns the nozzle tips 128 with the gates 130. When the nozzle 18 is heated to the operating temperature, thermal expansion drives the locating and sealing ring 90 forwardly against the inwardly tapered portion 134 of the surface 94. This increases contact between them and more accurately aligns the nozzle tips 128 with the gates 130. In this embodiment, the locating and sealing ring 90 is deformed a little by contact against the inwardly tapered portion 134 of the surface 94 which provides a seal to prevent leakage of melt between them into the air space 114 around the heated nozzle 18.

Figure 8:
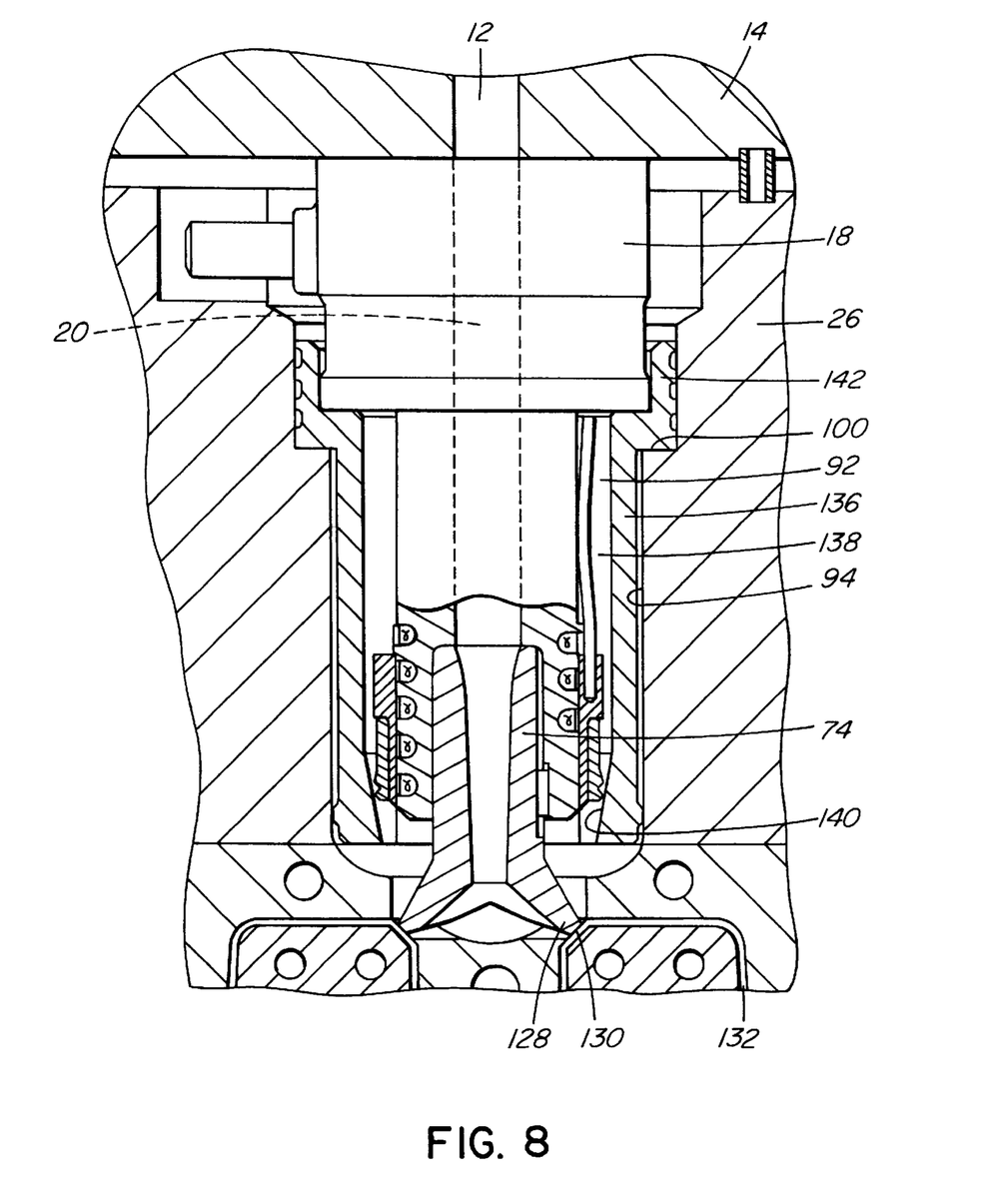
FIG. 8 is a sectional view of a portion of a multi-cavity injection molding apparatus according to a further embodiment of the invention and, FIG. 9 is a sectional view of a portion of a multi-cavity injection molding apparatus according to a still further embodiment of the invention.

Reference is now made to FIG. 8 to describe a further embodiment of the invention. In this embodiment, each nozzle 18 similarly has an insert 74 with a number of tip 128, each aligned with a gate 130 leading to a cavity 132. As can be seen, in this embodiment an insert 136 made of a suitable steel is pressed or screwed into the opening 92 between the heated nozzle 18 and the surrounding mold 26. This insert 136 has an opening 138 therethrough in which the nozzle 18 is seated. In this case, the surface 94 of the opening in the mold 26 is cylindrical, but the surface 140 of the opening 138 through the insert 136 tapers slightly inwardly towards the gates 130. The insert 136 has a ribbed rear collar portion 142 which sits against shoulder 100 to retain the insert 136 in place. Initially the locating and sealing ring 90 abuts against the inwardly tapered surface 140 of the opening 138 through the insert 136. When the nozzle 18 is heated to the operating temperature, thermal expansion similarly drives the locating and sealing ring 90 forwardly against the inwardly tapered surface 140 to improve alignment and sealing. In another embodiment, the insert 136 can be made of titanium or a suitable ceramic material to provide thermal insulation between the heated nozzle 18 and the surrounding cooled mold 26.

Figure 9:
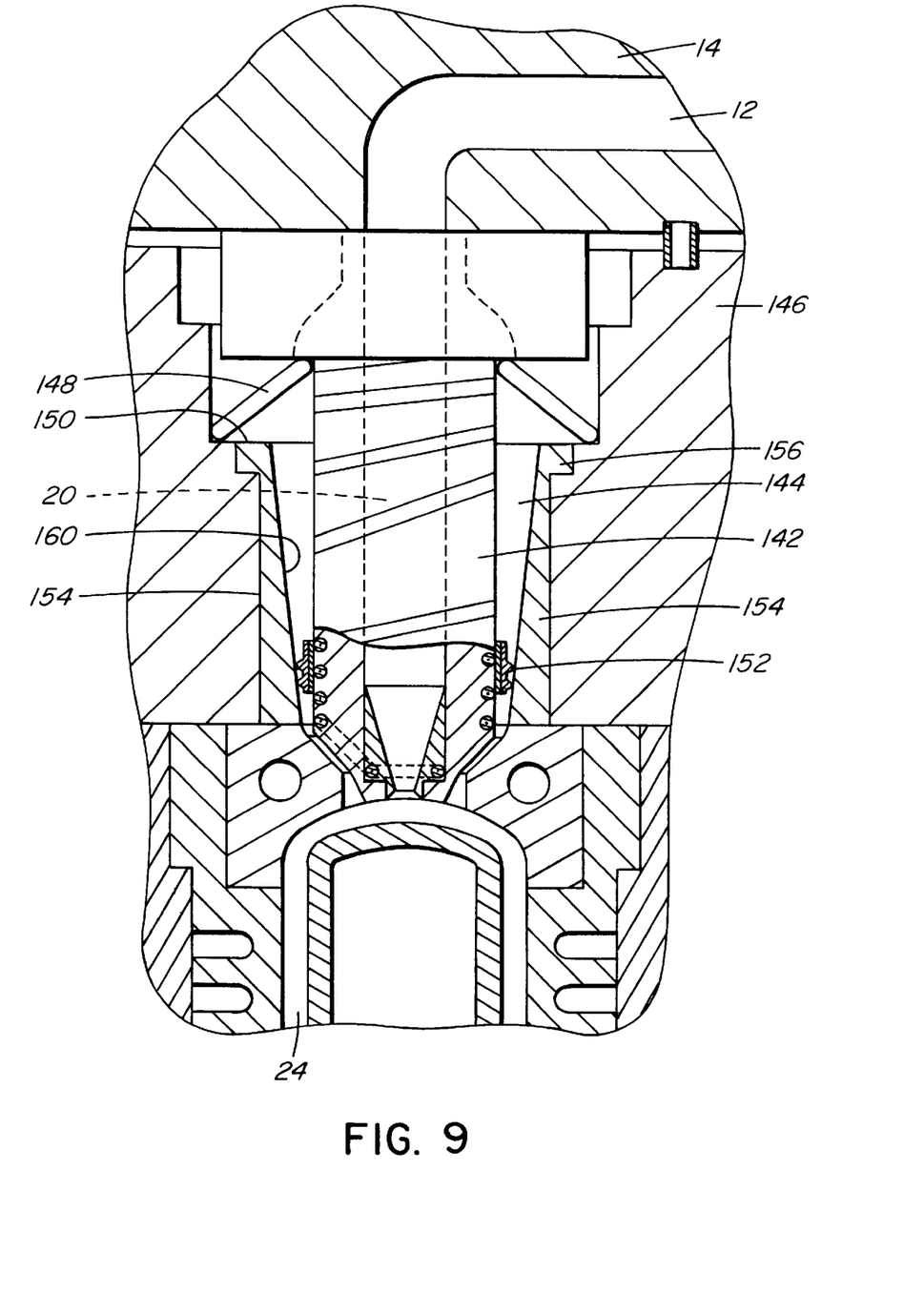

Another embodiment of the invention is shown in FIG. 9. In this case, each nozzle 142 is seated in an opening 144 in a mold 146 by a diagonal locating and sealing ring 148 received in a seat 150 in the mold 26. In this case, the nozzle 142 has a locating and sealing ring 152 integrally brazed around it. An insert 154 with a rear retaining lip 156 is seated in the opening 144 in the mold 146. The insert has a cylindrical outer surface 158, but an inwardly tapered inner surface 160 against which the locating and sealing ring 152 abuts. As described above, when the nozzle 18 is heated to the operating temperature, thermal expansion drives the locating and sealing ring 152 forwardly against the inwardly tapered surface 160 to improve alignment and sealing.

While the description of the injection molding apparatus wherein each nozzle with a locating and sealing ring has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus having at least one nozzle (18) extending into an opening (92) in a mold (26), the opening (92) having a rear end (106) and a surface (94) extending to at least one gate (22) leading to a cavity (24), the nozzle (18) having a rear end (108), a front end (78) and a melt bore (20) extending therethrough from the rear end (108) to the front end (78), the improvement wherein:

the surface (94) of the opening (92) in the mold (26) has a first locating shoulder (102) extending inwardly near the rear end (106) and a second locating shoulder (104) near the gate tapering inwardly toward the gate (22), the nozzle (18) has a rear locating flange (98) that extends outwardly into locating contact with the first inwardly extending locating shoulder (102) of the surface (94) of the opening (92) in the mold (26), and a front locating and sealing ring (90) is mounted around the heated nozzle (18) near the front end (78) of the heated nozzle (18) to provide locating contact with the second inwardly tapering locating shoulder (104) of the surface (94) of the opening (92) in the mold (26), the annular envelope defined by the outer annular surface of the locating and sealing ring (90) forming an acute angle with the inwardly tapering locating shoulder (104), the distance between the first inwardly extending locating shoulder (102) and the second inwardly tapering locating shoulder (104) being greater than the distance between the rear locating flange (98) and the front locating and sealing ring (90) whereby, during insertion of the nozzle (18) into the opening (92) in the mold (26) and thermal expansion of the nozzle (18), the rear locating flange (98) comes into locating contact with the first inwardly extending locating shoulder (102) of the surface (94) of the opening (92) in the mold (26) to prealign the nozzle (18) before the front locating and sealing ring (90) comes into locating and sealing contact with the second inwardly tapering locating shoulder (104) of the surface (94) of the opening (92) in the mold (26).

2. An injection molding apparatus as claimed in claim 1 wherein the first inwardly extending locating shoulder (102) is at least partially tapered inwardly.

3. An injection molding apparatus as claimed in claim 1 wherein the at least one heated nozzle (18) has a locating and sealing backing sleeve (84) integrally mounted around the inner portion adjacent the front end of the inner portion, the locating and sealing ring backing sleeve (84) having a cylindrical front outer surface (86) around which the locating and sealing ring (90) fits and a forwardly facing shoulder (88) against which the locating and sealing ring (90) abuts.

4. An injection molding apparatus as claimed in claim 3 wherein the locating and sealing ring (90) is suitably deformable.

5. An injection molding apparatus as claimed in claim 4 wherein the locating and sealing ring (90) is generally cylindrical.

6. An injection molding apparatus as claimed in claim 5 wherein the locating and sealing ring (90) has a ribbed outer surface.

7. An injection molding apparatus as claimed in claim 6 wherein the locating and sealing ring (90) is made of a soft titanium alloy.

8. An injection molding apparatus comprising a nozzle (18) extending into an opening (92) in a mold (26), the opening (92) extending to a gate (22) leading to a cavity (24), the opening (92) having a surface (94) with a front portion (111) that tapers inwardly towards the gate (22), the nozzle (18) having a melt bore (20) extending therethrough and a tip (82), and a locating ring (90) secured to the nozzle (18), whereby in a fully inserted position of the nozzle (18) the locating ring (90) contacts only a first part of the inwardly tapered portion (111) of the surface (94) and thermal expansion of the nozzle from heating to an operating temperature moves the locating ring (90) forwardly into contact with a larger part of the inwardly tapered portion (111) of the surface (94) of the opening (92).

9. An injection molding apparatus as claimed in claim 8 wherein the nozzle (18) has a rear locating flange (98) and the surface (94) of the opening (92) has a portion that fits around the rear locating flange (98) to ensure proper alignment of the nozzle (18) in both the first and second positions of the nozzle (18).

10. An injection molding apparatus as claimed in claim 8 wherein the locating ring (90) prevents melt leakage between the locating ring (90) and the surrounding front tapered portion (104) of the surface (94) of the opening (92).

11. An injection molding apparatus as claimed in claim 8 further comprising a sleeve (84) secured around the nozzle (18), the sleeve (84) having an opening (85) therein to receive a thermocouple element (87).

12. An injection molding apparatus as claimed in claim 11 wherein the locating ring (90) extends around the sleeve (84).

13. An injection molding apparatus as claimed in claim 11 wherein the sleeve (84) is brazed around the nozzle (18).

14. An injection molding apparatus as claimed in claim 12 wherein the locating ring (90) is secured around the sleeve (84).

15. An injection molding apparatus as claimed in claim 12 wherein the locating ring (90) is heat shrunk around the sleeve (84).

16. An injection molding apparatus as claimed in claim 14 wherein the sleeve (84) has a forwardly facing shoulder (88) against which the locating ring (90) abuts.

17. An injection molding apparatus comprising a nozzle (18) extending into an opening (92) in a mold (26), the opening (92) extending to a gate (22) leading to a cavity (24), the opening (92) having a surface (94) with a front portion (111) that tapers inwardly towards the gate (22), the nozzle (18) having a melt bore (20) extending therethrough, a heater (70) and a tip, and a locating and sealing ring (90) secured to the nozzle (18) that contacts the inwardly tapered portion (111) of the surface (94), the annular envelope defined by the outer annular surface of the locating and sealing ring (90) forming an acute angle with the inwardly tapered portion (111), whereby after heating of the nozzle (18) to an operating temperature thermal expansion pushes the locating and sealing ring (90) outwardly and forwardly to increase locating and sealing against the inwardly tapered portion (111) of the surface (94) of the opening (92).

18. An injection molding apparatus comprising a nozzle (18) extending into an opening (92) in a mold (26), the opening (92) extending to at least one gate (130) leading to a cavity (132), the opening (92) having a surface (94) with at least a tapered portion (134) that tapers inwardly towards the at least one gate (130), the nozzle (18) having a melt bore (20) extending therethrough, and a locating and sealing ring (90) secured to the nozzle (18) that contacts the inwardly tapered portion of the surface (94), whereby thermal expansion of the nozzle from heating to an operating temperature drives the locating and sealing ring (90) forwardly into greater surface contact against the inwardly tapered portion of the surface (94) of the opening (92).

19. An injection molding apparatus as claimed in claim 18 wherein the locating and sealing ring (90) is suitably deformable.

20. An injection molding apparatus as claimed in claim 19 wherein the locating and sealing ring (90) is generally cylindrical.

21. An injection molding apparatus as claimed in claim 20 wherein the locating and sealing ring (90) has a ribbed outer surface.

22. An injection molding apparatus as claimed in claim 21 wherein the locating and sealing ring (90) is made of a soft titanium alloy.

23. An injection molding apparatus comprising a nozzle (18) extending into an opening (138) through an insert (136) received in an opening (92) in a mold (26), extending to at least one gate (130) leading to a cavity (132), the opening (138) through the insert (136) having a surface (140) with at least a tapered portion that tapers inwardly towards the at least one gate (130), the nozzle (18) having a melt bore (20) extending therethrough, and a locating and sealing ring (90) secured to the nozzle (18) that contacts the inwardly tapered portion of the surface (140) of the opening (138) through the insert (136), whereby thermal expansion of the nozzle from heating to an operating temperature drives the locating and sealing ring (90) forwardly into greater surface contact against the inwardly tapered portion of the surface (140) of the opening (138) through the insert (136).

24. An injection molding apparatus as claimed in claim 23 wherein the locating and sealing ring (90) is suitably deformable.

25. An injection molding apparatus as claimed in claim 24 wherein the locating and sealing ring (90) is generally cylindrical.

26. An injection molding apparatus as claimed in claim 25 wherein the locating and sealing ring (90) has a ribbed outer surface.

27. An injection molding apparatus as claimed in claim 26 wherein the locating and sealing ring (90) is made of a soft titanium alloy.

28. An injection molding apparatus comprising a nozzle with a melt bore extending therethrough and a mold, the nozzle extending into an opening in the mold, the opening having a rear end and a surface that extends from the rear end to a gate which leads to a cavity, the surface of the opening having a tapered portion near the gate that tapers inwardly towards the gate, and a locating and sealing ring secured to the nozzle and having an outer surface that contacts the inwardly tapered portion of the surface of the opening, wherein the outer surface of the locating and sealing ring and the tapered portion of the surface of the opening form a wedge-shaped gap that widens in the direction of the rear end of the opening.

* * * * *